US008420205B2

(12) United States Patent
Raab

(10) Patent No.: US 8,420,205 B2
(45) Date of Patent: Apr. 16, 2013

(54) MIXED MEDIA ARTWORK AND METHODS OF CREATION

(76) Inventor: Simon Raab, Santa Barbara, CA (US)

( * ) Notice: Subject to any disclaimer, the term of this patent is extended or adjusted under 35 U.S.C. 154(b) by 398 days.

(21) Appl. No.: 12/818,519

(22) Filed: Jun. 18, 2010

(65) Prior Publication Data

US 2010/0323128 A1 Dec. 23, 2010

Related U.S. Application Data

(60) Provisional application No. 61/218,626, filed on Jun. 19, 2009.

(51) Int. Cl.
*B32B 3/00* (2006.01)
*A47G 1/12* (2006.01)
*B44C 5/00* (2006.01)

(52) U.S. Cl.
USPC ................ 428/172; 428/13; 428/15; 428/156

(58) Field of Classification Search .................... 428/13, 428/15, 16, 17, 156, 161, 164, 172, 195.1, 428/207, 209, 203, 204
See application file for complete search history.

(56) References Cited

U.S. PATENT DOCUMENTS

| | | | |
|---|---|---|---|
| 1,592,557 | A | 7/1926 | Connor |
| 2,249,495 | A | 7/1941 | Reuter |
| 5,534,315 | A | 7/1996 | Witte |
| 6,569,277 | B1 | 5/2003 | Gibbs |
| 7,182,828 | B2 | 2/2007 | Zirker |
| 2004/0071898 | A1 | 4/2004 | Trabucco |
| 2008/0235924 | A1 | 10/2008 | Waldner |

FOREIGN PATENT DOCUMENTS

| | | | |
|---|---|---|---|
| DE | 3114461 | A1 | 8/1982 |
| DE | 19818494 | A1 | 10/1999 |
| EP | 1342589 | A1 | 9/2003 |
| GB | 2422881 | A | 8/2006 |
| WO | 2003053196 | A1 | 7/2003 |

OTHER PUBLICATIONS

Raab, Written Opinion for PCTUS2010039149 (form PCT/ISA/237), mailed on Jun. 20, 2011, 8 pp.
Raab, International Search Report for PCT/US2010/039149 (form PCT/ISA/220) mailed on Jun. 20, 2011, 6 pp.

*Primary Examiner* — Catherine A Simone
(74) *Attorney, Agent, or Firm* — Cantor Colburn LLP

(57) ABSTRACT

A method of making mixed media artwork includes cutting a metal sheet; applying an adhesive layer to an outer surface of the metal sheet; applying one or more polymer layers to the adhesive layer, wherein the one or more polymer layers create an image on the outer surface; and deforming the metal sheet to create a three-dimensional outer surface.

2 Claims, 14 Drawing Sheets

MIXED MEDIA ARTWORK AND METHODS OF CREATION

CROSS-REFERENCE TO RELATED APPLICATION

This application claims the benefit of U.S. Patent Application No. 61/218,626 filed on Jun. 19, 2009, which is incorporated herein by reference in its entirety.

BACKGROUND

This invention generally relates to mixed media artwork and methods of creating the artwork.

Art is the process or product of deliberately arranging elements in a way that appeals to the senses or emotions. It encompasses a diverse range of human activities, creations, and modes of expression, including music and literature. The meaning of art is explored in a branch of philosophy known as aesthetics.

An art form is the specific shape, or quality an artistic expression takes. The media used often influences the form. For example, the form of a sculpture exists in space in three-dimensions, and responds to gravity. The constraints and limitations of a particular medium are thus called its formal qualities. To give another example, the formal qualities of painting are the canvas texture, color, and brush texture. The formal qualities of video games are non-linearity, interactivity and virtual presence. The form of a particular work of art is determined by both the formal qualities of the media, and the intentions of the artist.

Society's renewed interest in works of arts has resulted in the demand for classic art forms, reproductions of original classics, and new types of artwork or art forms. Accordingly, there continually remains a desire for new art forms that result in unique artwork, whether it be two-dimensional paintings, three-dimensional work, or some combination thereof.

SUMMARY OF INVENTION

In one embodiment, a method of making mixed media artwork includes cutting a metal sheet; applying an adhesive layer to an outer surface of the metal sheet; applying one or more polymer layers to the adhesive layer, wherein the one or more polymer layers create an image on the outer surface; and deforming the metal sheet to create a three-dimensional outer surface.

In another embodiment, a method of creating a freestanding mixed media artwork includes cutting a metal sheet; applying an adhesive layer to an outer surface of the metal sheet; applying one or more polymer layers to the adhesive layer, wherein the one or more polymer layers create an image on the outer surface; deforming the metal sheet to create a hollow three-dimensional object wherein edges of the metal sheet overlap and the three-dimensional object comprises a hole providing access to an interior of the object; and back filling the interior of the object with a support filler material configured to provide support to the three-dimensional object.

A mixed media artwork includes a metal sheet deformed into a three-dimensional object comprising an exterior and an interior; a support filler material disposed in the interior to provide support to the three-dimensional object; an adhesive layer disposed on the exterior; one or more color polymer layers disposed on the adhesive layer, wherein the one or more polymer layers create an image on the exterior; one or more transparent layers disposed in alternating fashion between each of the one or more color polymer layers, wherein the interleaved transparent layers are configured to allow light to transmit between the one or more color polymer layers; and one or more polymer finish layers disposed over all of the one or more polymer layers and one or more transparent layers, wherein the one or more polymer finish layers are configured to form pools in one or more undulations in the three-dimensional outer surface and provide a lensing effect to light that reflects on the surface.

The invention is further illustrated by the following drawings, detailed description, and examples.

BRIEF DESCRIPTION OF DRAWINGS

Referring now to the exemplary drawings wherein like elements are numbered alike in the several figures.

DETAILED DESCRIPTION

Figure 1:
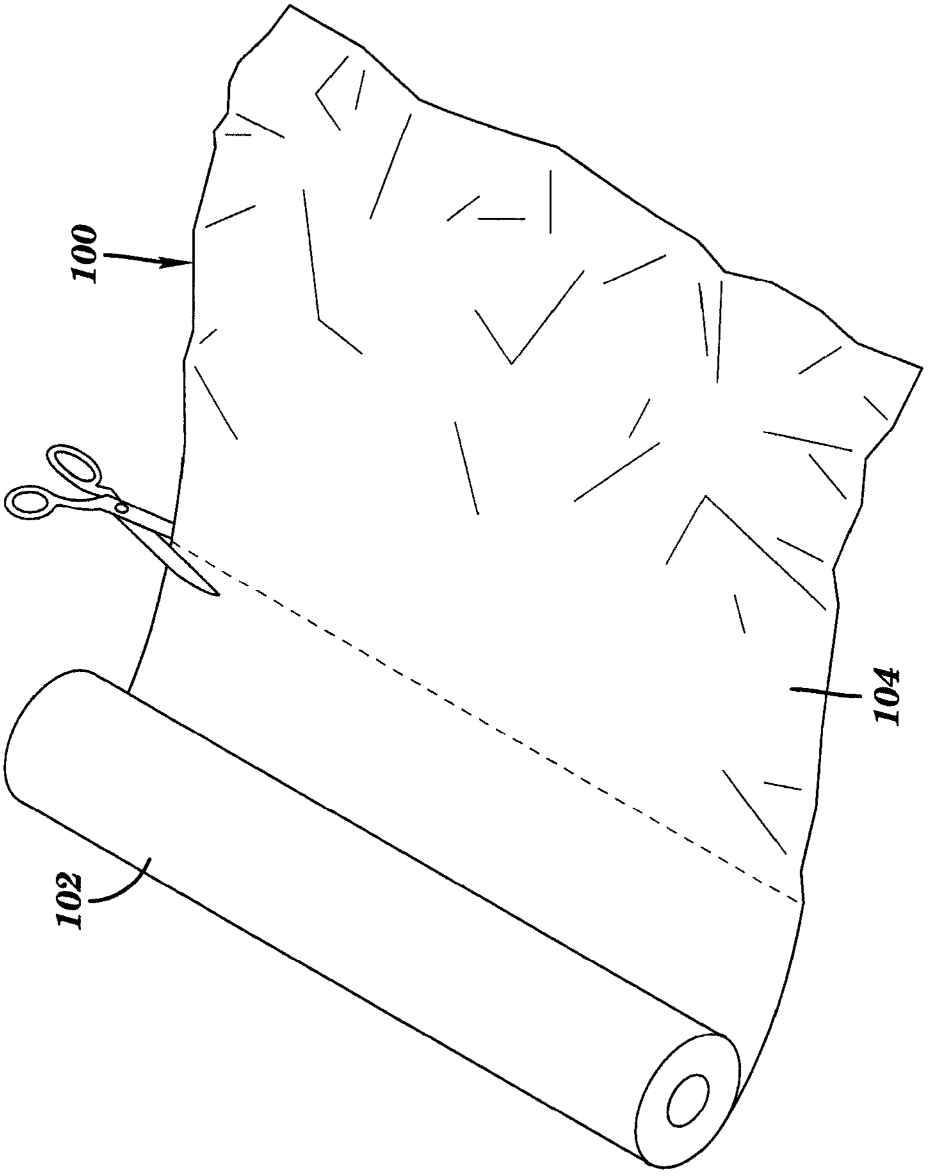
FIG. 1 shows an exemplary embodiment of cutting a metal sheet.

Disclosed herein are methods of creating mixed media artwork and the artwork formed therefrom. Generally, a method of creating the mixed media artwork described herein includes cutting a metal sheet to a desired size and shape; cleaning the outer surface of the metal sheet, applying one more layers of polymer to the outer surface to create an image, and shaping the metal sheet and one or more polymer layers to create a three-dimensional relief of the image. As used herein, the term "mixed media artwork" is generally intended to include a variety of three-dimensional art forms. Exemplary art forms can include planar art, such as the type that can be mounted to a support frame and hung on a vertical surface, sculptures, such as free-standing artwork, and the like. The difference in the forms of artwork created will depend, in part, on the scale of the three-dimensional relief of the metal sheet on which the image is disposed. Large scale three-dimensional deformation of the metal sheet can result in stand-alone sculptures that do not require support structures. Smaller scale three-dimensional deformation, such as relief bumps on the surface of the metal sheet, can result in a more planar art form, which can be fixed to a support frame for structural support and durability, and to provide the ability to display the artwork, such as, for example, on a wall. Moreover, as used herein, “polymer” is intended to refer to any of the one or more layers disposed on the surface of the metal sheet. Exemplary polymers can include, without limitation, adhesives for bonding layers to the metal or layer-to-layer bonding, acrylics for color and/or visual effect, protective coatings, coatings to affect light reflectivity and transmission, and the like.

The mixed media artwork formed by the methods described herein create a unique art form. Specifically, the three-dimensional surface formed by these methods create a visual effect such that a viewer feels he/she is viewing the image through rippling water. The still image is as if below the surface of rippling water. In particular, varying layers of polymers, such as, for example, alternating layers of color and clear polymers helps to gives an illusion of a vibrant, moving, living image to the artwork.

As mentioned above, the method for creating artwork having a three-dimensional surface includes cutting a metal sheet to a desired size and shape. Useful metals for the metal sheet can include any metal capable of being deformed to provide a three-dimensional surface, which can then have polymer layers, such as acrylics, adhesives, and the like, adhered thereto. Exemplary metals for use as the metal sheet can include, without limitation, stainless steel, copper, gold, silver, aluminum, zinc, tin, lead, transition metals, combinations thereof, alloys thereof, and the like. There are no particular limitations regarding the thickness of the metal sheet, nor are there any limitations as to the shape, size or initial texture of the surface of the metal sheet. Some consideration, however, can be given to the initial size and shape of the metal sheet. In some embodiments, the initial shape of the metal sheet is selected based upon the desired final shape of the artwork. Similarly, the initial size (e.g. dimensions or area) of the metal sheet can be selected based upon the desired final dimensions of the artwork. For example, in some embodiments, the final dimensions of the metal sheet (and thereby the image disposed thereon) will be smaller than the initial dimension of the metal sheet due to the deformation the sheet undergoes as part of the creation method. In one embodiment, the final size of the metal sheet and three-dimensional image can be about 5 percent (%) to about 35% smaller than the initial size of the metal sheet and initial two-dimensional image. Likewise, even though there are no limitations regarding metal sheet thickness, the chosen thickness will affect the methods by which the three-dimensional surface is formed. Such methods will be described in greater detail below.

FIG. 1 is a photographic illustration of cutting the metal sheet 100 for the method described herein. In the particular embodiment of FIG. 1, the metal sheet 100 is being cut from an aluminum foil roll 102, and has a rectangular shape. The thickness of the aluminum sheet is such that the sheet can be cut using standard scissors. Metal sheets of greater thickness could require other tools, such as sheers, knives, saws, lasers, water jets, and the like.

Figure 2:
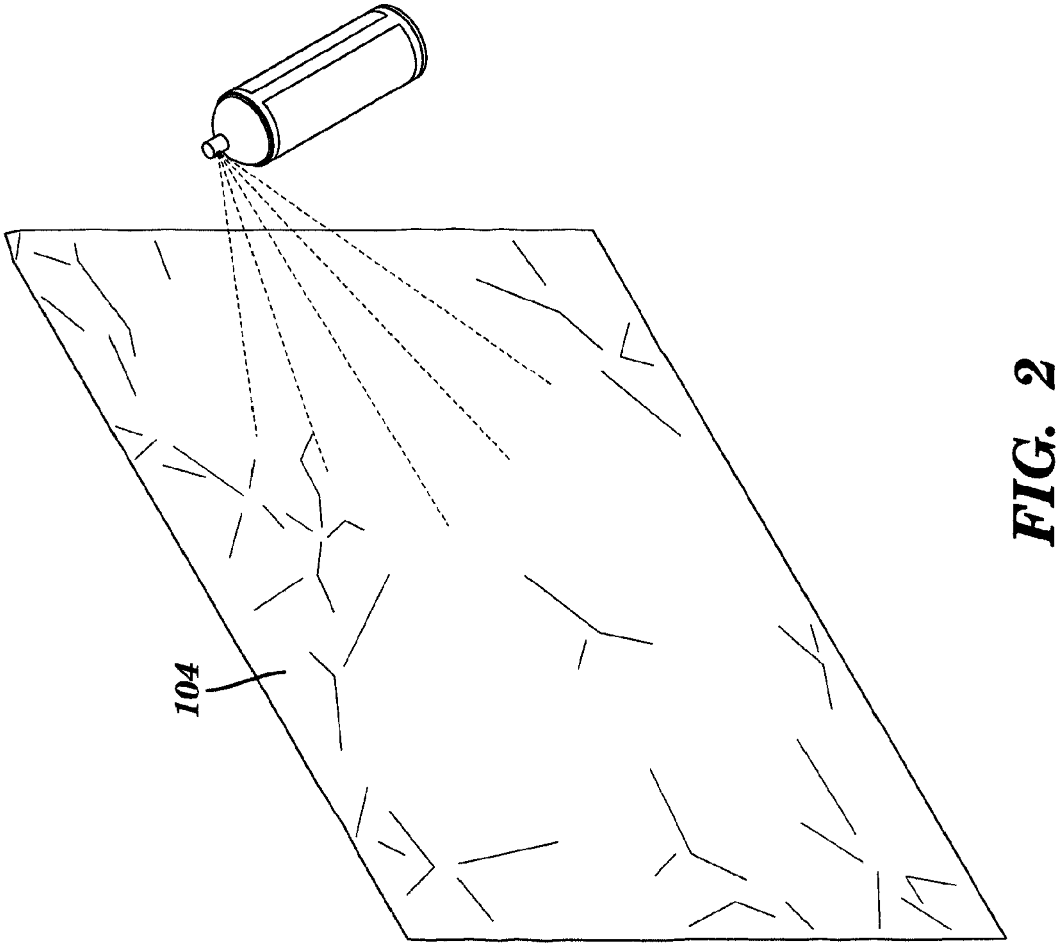
FIG. 2 shows an exemplary embodiment of a cleaning and/or polishing the metal sheet of FIG. 1.

In an optional embodiment, the outer surface 104 (i.e., the surface on which the image will be created) of the metal sheet 100 can be cleaned, polished, and the like in preparation for the application of one or more polymer layers. Any cleaning solution and/or polish known to clean the surface of a metal sheet can be used to prepare the outer surface for application of the polymer layers. FIG. 2 is a photographic illustration of the outer surface of the metal sheet of FIG. 1 being cleaned and polished. In the particular embodiment of FIG. 2, an aerosol cleaning spray is used and the surface can be wiped clean and polished using a hand towel or rag.

After the metal sheet has been cut to the desired size and shape and the outer surface of the metal sheet has been optionally cleaned and/or polished, an adhesive layer is applied to the outer surface. The adhesive layer is applied in order to aid the subsequent polymer layers that create the artistic image to adhere to the metal sheet, and remain adhered throughout the three-dimensional formation step. The adhesive layer can be applied to completely cover the outer surface 104 or to only cover selected regions of the surface. Useful adhesive layers are comprised of adhesives able to securely adhere a polymer layer, such as an acrylic, to the metal. Exemplary adhesives can include, without limitation, epoxy resins, such as silane-based epoxies, ultra-violet (UV)-stabilized epoxies, marine-based epoxies, and the like. In one embodiment, the adhesive layer is as thin as possible while still providing the necessary adhesive properties to prevent the polymer layers from peeling off of the metal sheet. In one embodiment, the adhesive layer comprises a marine-based, UV-stabilized epoxy. In order to form such a thin, spreadable layer, the marine-based, UV-stabilized epoxy is diluted with a suitable solvent, such as acetone.

Figure 3:
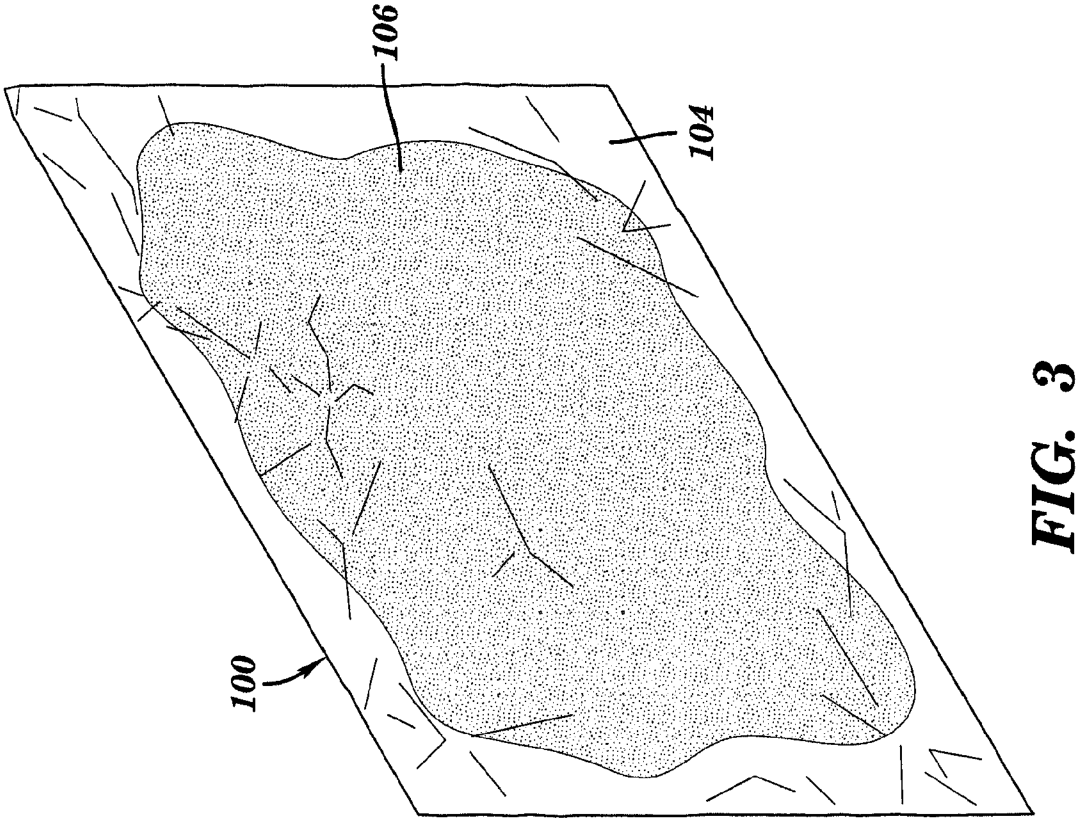
FIG. 3 shows an exemplary embodiment of applying an adhesive layer on the metal sheet.

FIG. 3 photographically illustrates an exemplary embodiment of the application of an adhesive layer 106 to the outer surface 104 of the metal sheet 100. In the particular embodiment of FIG. 3, the adhesive is applied with a brush to the metal sheet. In other embodiments, the adhesive layer can be applied by any method, such as spraying, pouring, coating, and the like.

After application of the adhesive layer, one or more layers of polymer can be applied to the metal sheet in order to create the image desired by the artist. In one embodiment, the adhesive is allowed to cure/dry prior to application of the polymer (s). The process involves applying differing transparent, translucent, partially transparent and opaque polymers and metallic layers to the surface of a deformable metal sheet. The layers require flexibility adherence to the metal sheet and inter-layer adherence such as to permit manual or machine induced deformation of the metal in random and regular intentional and accidental surface texture depicting a surface in motion. As such, each layer or layer can be of varying color, opacity, transparency, translucency, combinations thereof, and the like. Again, because the method of creation described herein is a descriptive process, it can be highly variable. As such, any number of layers can be applied to the metal sheet. The number of layers will depend on the desired image that results therefrom. For example, in one embodiment the artwork can comprise one layer on the metal sheet. In another embodiment, the artwork can comprise a plurality of layers on the metal sheet. In the embodiment with a plurality of layers, each of the layers can provide a different color, transparency, opacity, and the like to the image of the artwork. As an example, a translucent layer can permit the metal to shimmer through the layers of the image and enhance the colors therein. In order to form the image a single layer of color polymer (i.e., acrylic paint) can be used, or multiple layers of multiple color polymers can be used. Again, as used herein, polymer layers is generally intended to mean, without limitation, opaque layers, translucent layers, transparent layers, color layers, and combinations thereof adhered to the metal sheet. Exemplary polymer layers can include, without limitation, acrylic paints. Acrylic paint types can include, without limitation, Rhoplex, latex, latex enamel, house points and sprays, and the like. In addition, the acrylic paints may be modified by retardants, flow release liquids, acrylic media and gels, they may be used separately or in combination with most other media such as oilbase and waterbase paints and inks, crayons, oil paint, sticks and markers, and the like.

Regardless of the type of polymer layer, a key property is that each subsequent layer disposed over the adhesive layer adheres to the layers immediately adjacent to each surface of the layer. For example, the polymer layer disposed on the adhesive layer will adhere to both the adhesive layer and the optional subsequent polymer layer disposed thereon.

Figure 4:
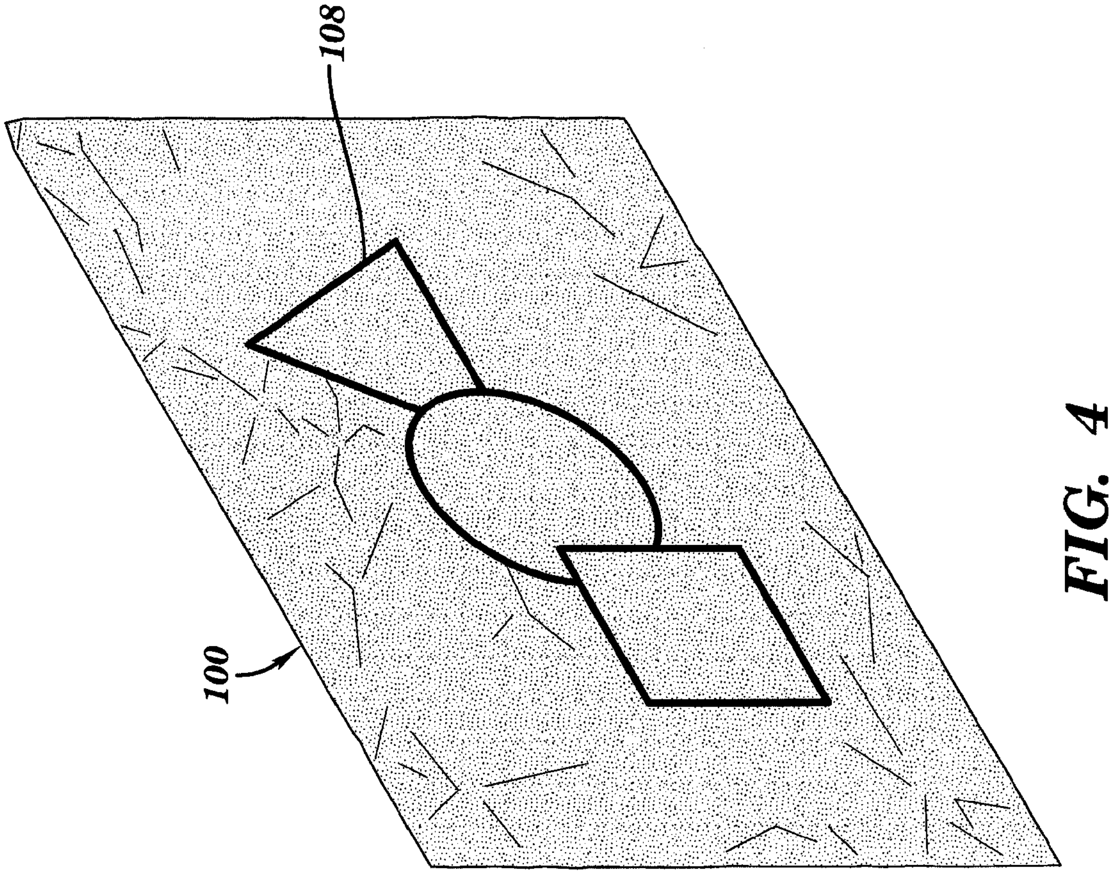
FIG. 4 shows an exemplary embodiment of applying one or more polymer layers to create an image.

Like the metal sheet itself, each of the polymer layers added to the sheet can have any thickness required to provide the appropriate visual effect desired by the artist. Each layer can have the same thickness or different thicknesses. The polymer layer or the combination of polymer layers forms a planar (e.g. two-dimensional) version of the image envisioned by the artist. Moreover, the layers of applied acrylics can be used as stopouts as well as compositional elements in that an applied layer not covering the whole of the metal sheet or the previously applied polymer layer allows those vacant areas to be painted with different color polymer layers. Moreover, even before formation of the three-dimensional surface, any layer of acrylic can be worked with tools (e.g., stylus, fingernail, etc.) to remove dried acrylic paint so that other layers of different color or translucency are exposed and/or applied over those areas. Turning now to FIG. 4, a photographic illustration of the application of one or more polymer layers onto the metal sheet and adhesive layer in order to create an artistic image 108.

In one embodiment, the polymer layers can be chosen for their particular inter-layer adherence properties. In other words, in one embodiment, the polymer layers can be chosen such that pieces of one or more of the polymer layers flake or chip off as the three-dimensional surface is create by forming the metal sheet. Such an embodiment can create an artwork having a worn, weathered, naturally aged, texture. In an embodiment where flaking or chipping off of the polymer layers is desired, it may be possible to apply the one or more polymer layers, such as the acrylic paints, without the use of an adhesive layer as described above. In this embodiment, the base polymer layer applied to the outer surface of the metal sheet could provide enough adherence to prevent subsequent layers from pulling away from the sheet, but does not adhere to the metal sheet so strongly that flaking and chipping of one or more of the layers is prevented.

In another embodiment, an optional transparent (i.e., clear) layer can be disposed on the adhesive layer, before application of the one or more colored polymer layers. The transparent layer can also be applied between the one or more polymer layers. For example, the artwork can comprise alternating layers of colored polymer layers and transparent (i.e., clear) polymer layers. In such an embodiment, and as mentioned above, the colored layers can be opaque, translucent, transparent, or some combination thereof. Then, between each colored layer, the optional transparent layer can be added. The interleaved transparent layer allows light to transmit between the colored layers enhancing the water effect look described herein. Any transparent polymer can be used to form the transparent layer. In one embodiment, the transparent layer(s) comprises polyurethane.

Figure 5:
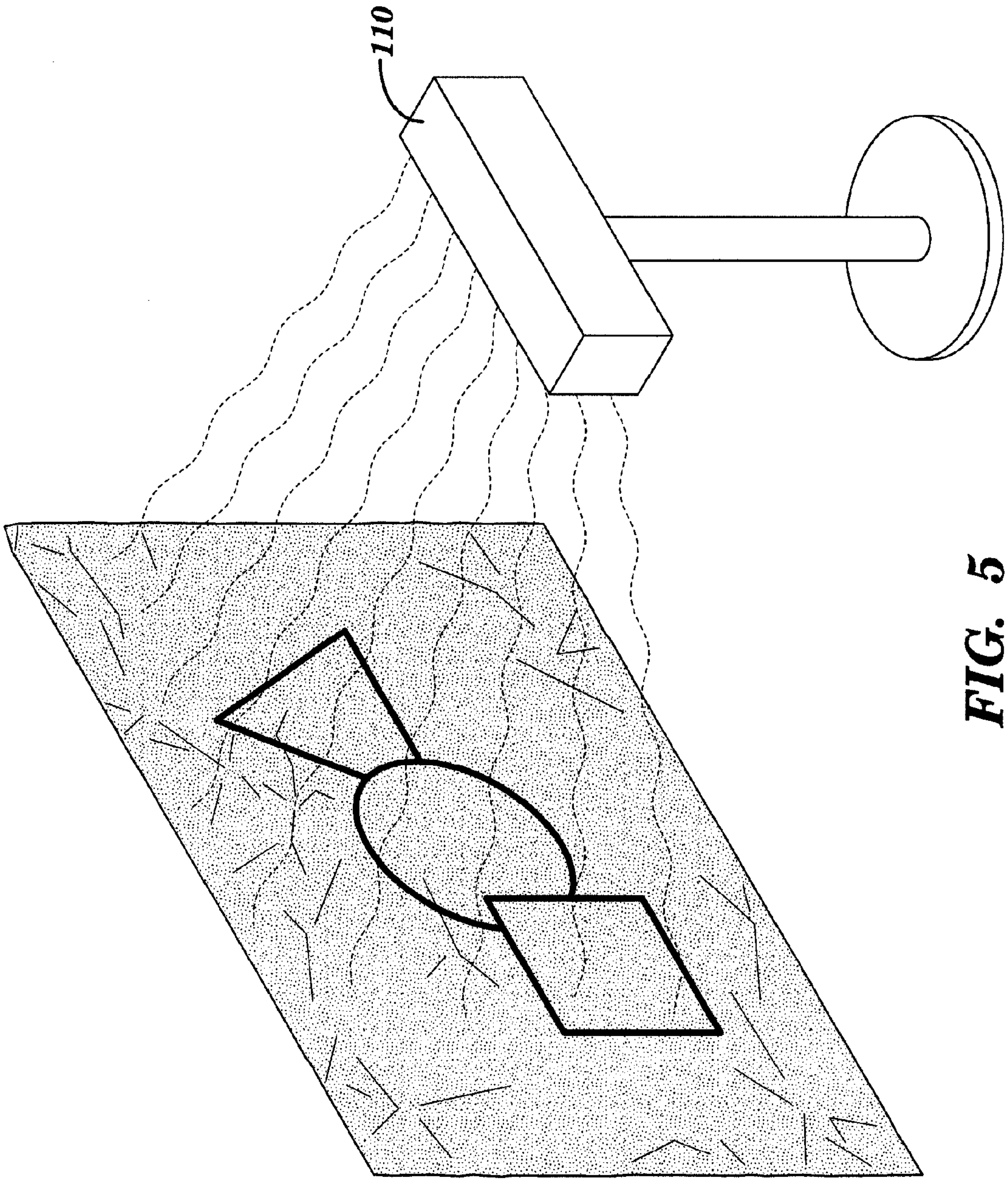
FIG. 5 shows an exemplary embodiment of drying/curing the one or more polymer layers.

The color polymer, adhesive, and/or transparent layers are applied and allowed to dry and/or cure individually as they are applied, or all at once after application of the final, outermost layer. Usually a period of about sixteen to twenty-four hours or more is sufficient, depending on the thickness of the layers and the effects of humidity and temperature on the polymerization process, to dry the layers. Exposure to heat sources such as, without limitation, the sun, heat lamps, driers, and the like, can speed drying time. Moreover, thinner polymer layers will require less time to dry. FIG. 5 photographically illustrates the use of a heat source, in this embodiment a heat lamp, to speed the drying of the polymer layers.

Figure 6:
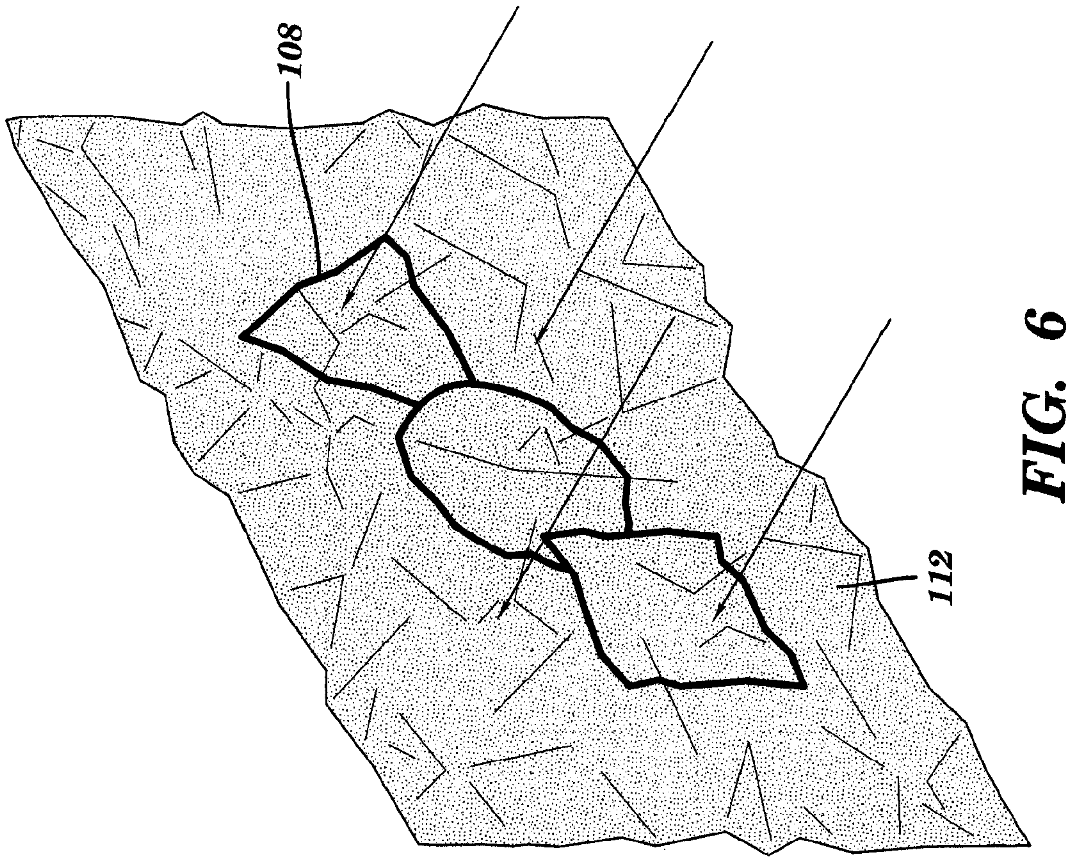
FIG. 6 shows an exemplary embodiment of deforming the coated metal sheet to form a three-dimensional surface.

After the one or more polymer layers are dry, the metal sheet is deformed to create the three-dimensional surface of the artwork. The metal sheet and polymer layers can be deformed by any means capable of creating a three-dimensional surface 112 to the image 108 created by the polymer layers. As mentioned above, the method of deformation will depend partly on, among other things, the thickness of the metal sheet and the type and number of polymer layers thereto. For example, where a thick stainless steel metal sheet is used, it may be necessary to deform the sheet using a hammer, punch, vise, machine, or other like tool suitable for deforming a metal sheet of such thickness. In another embodiment, where a thin and/or malleable metal is used, such as aluminum foil, it may be possible to simply deform the sheet and create a three-dimensional surface with the artist's hands (as shown in FIG. 6). To reiterate, the method of deformation will depend on the gauge of the metal sheet. Any method capable of deforming, crushing, folding, indenting, and the like the metal sheet are suitable to create the three-dimensional artwork described herein. Depending on the methods used and artistic vision, a variety of shapes and surface textures can be created that result in images of varying visual appeal.

Another variable includes the scale to which the deformations are created. For example, a high scale deformation would describe a sculpture or other stand-alone artwork, wherein the metal sheet has been deformed so greatly as to provide free-standing support to the artwork. In an example of low radius, high impact (i.e., low scale) deformation, a three-dimensional surface is created, but the overall artwork is of a planar shape suitable for mounting to a support frame for standing or wall mounting. Again, FIG. 6 photographically illustrates an embodiment of the method wherein the metal sheet and polymer layers are deformed by hand to create a three-dimensional surface.

Figure 7:
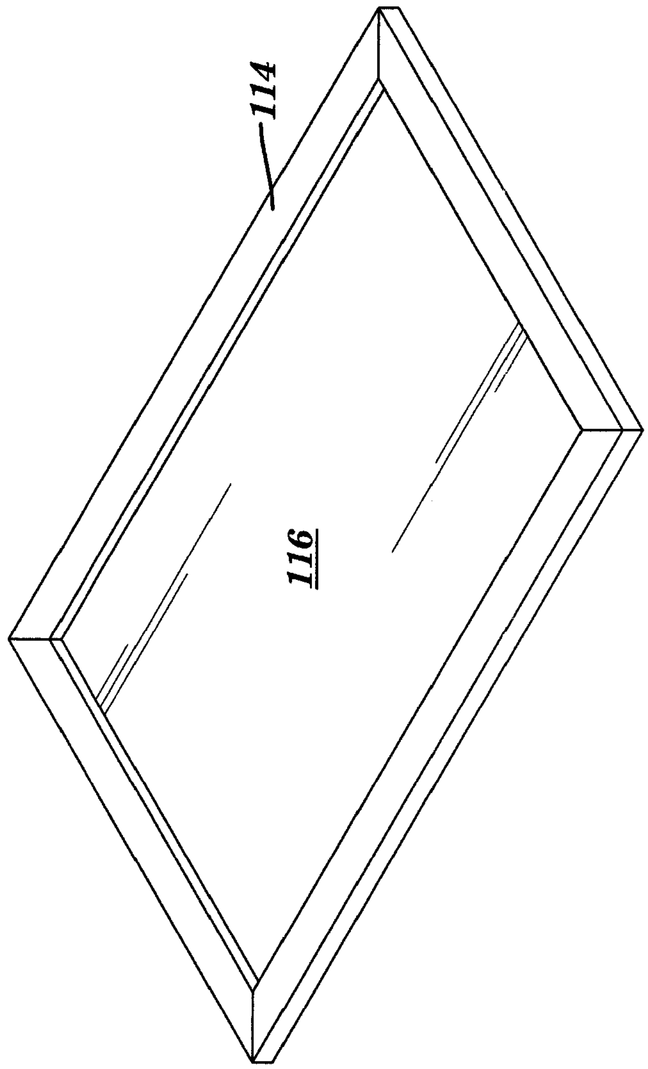
FIG. 7 shows an exemplary embodiment of building a support layer.

As mentioned, in some embodiments, at this point, a sculpture or stand-alone artwork has been created than can then be coated with a polymer layer to provide the desired surface finish and protection. In other embodiments, however, the three-dimensional object requires a support frame to provide a desired shape (profile), structural support, durability, or all of the above. For example, the support frame can be built to mirror the desired outer perimeter shape of the art work. In the case of a substantially planar and rectangular artwork, a rectangular support frame can be built to mirror the shape of the artwork. FIG. 6 is an exemplary embodiment of such a support frame 114, wherein the artwork can be secured within the perimeter of the frame or the artwork can be secured over the frame, such that the support is behind the artwork and not visual from the outer surface 104. Along with a perimeter, the support frames can provide a back support 116, such as a canvas, board, press board, or the like. FIG. 7 photographically illustrate construction of the support frame. In the particular embodiment of FIG. 7, the support frame has a rectangular shape and resembles a picture frame.

Figure 8:
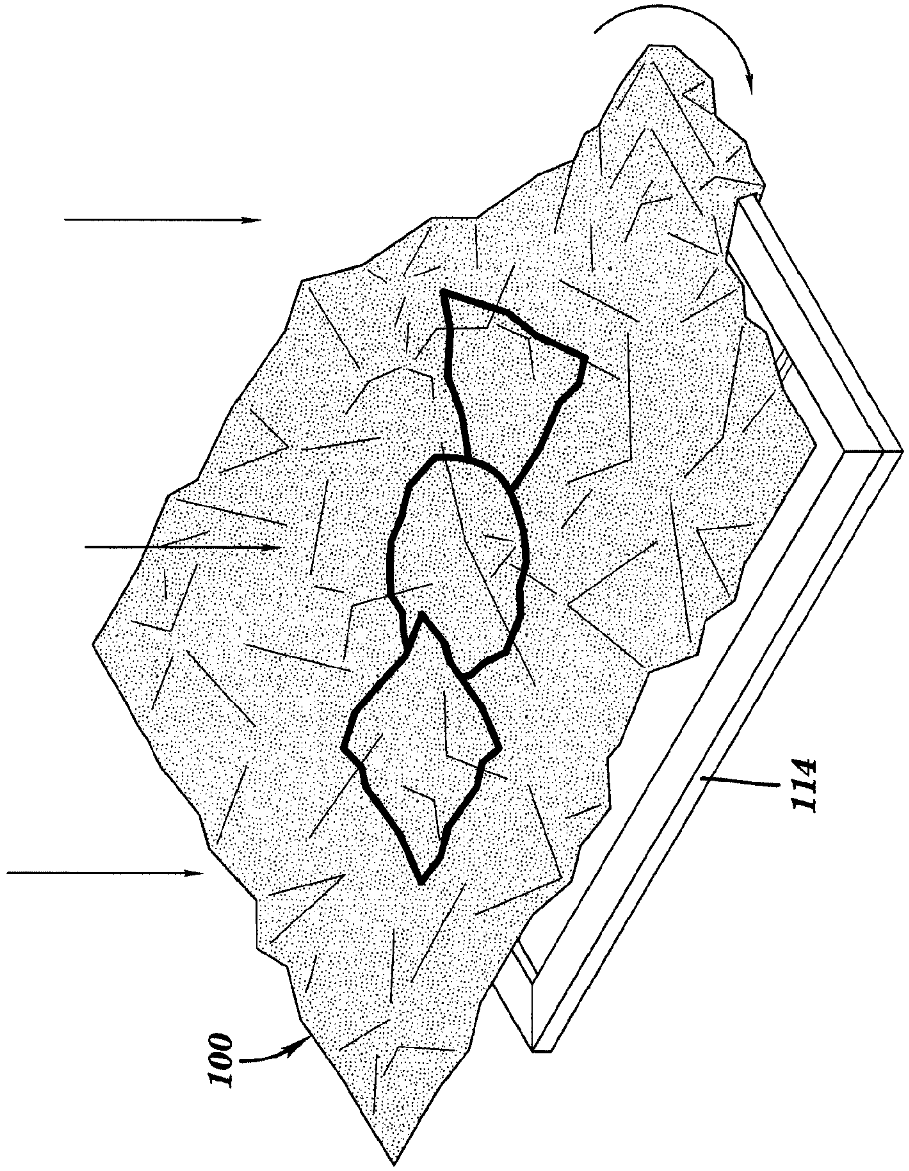
FIGS. 8-9 show exemplary embodiment of securing the metal sheet to the support layer.
Figure 9:
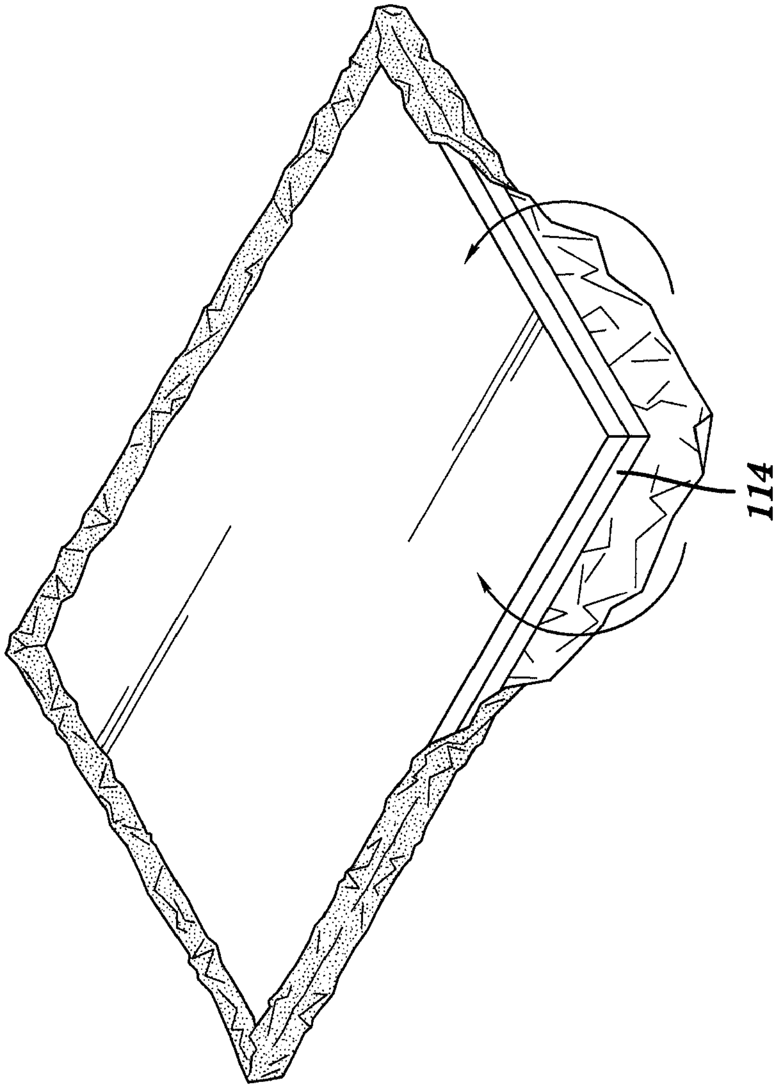

The deformed metal sheet and polymer layers can then be adhered to the support frame. This method step can require further formation of the metal sheet to the support frame. The metal sheet can be secured to the support frame by a variety of methods, such as, without limitation, adhesive, anchors, nails, stables, and other like methods of securing one physical object to another. FIGS. 8-9 photographically illustrate the method steps of securing the metal sheet to the newly formed support frame. In the embodiments illustrated by the figures, the metal sheet is first deformed around the support frame 114

(FIG. 8) and once in place, with the desired appearance on the outer surface of the metal sheet (i.e., the front side of the support frame), the metal sheet is secured to the support frame. FIG. 9 shows the artwork being secured to the support frame with a hammer and nails. Like the methods of deformation, the means of securing the artwork to the support frame will depend on the gauge and type of metal used for the metal sheet.

Figure 10:
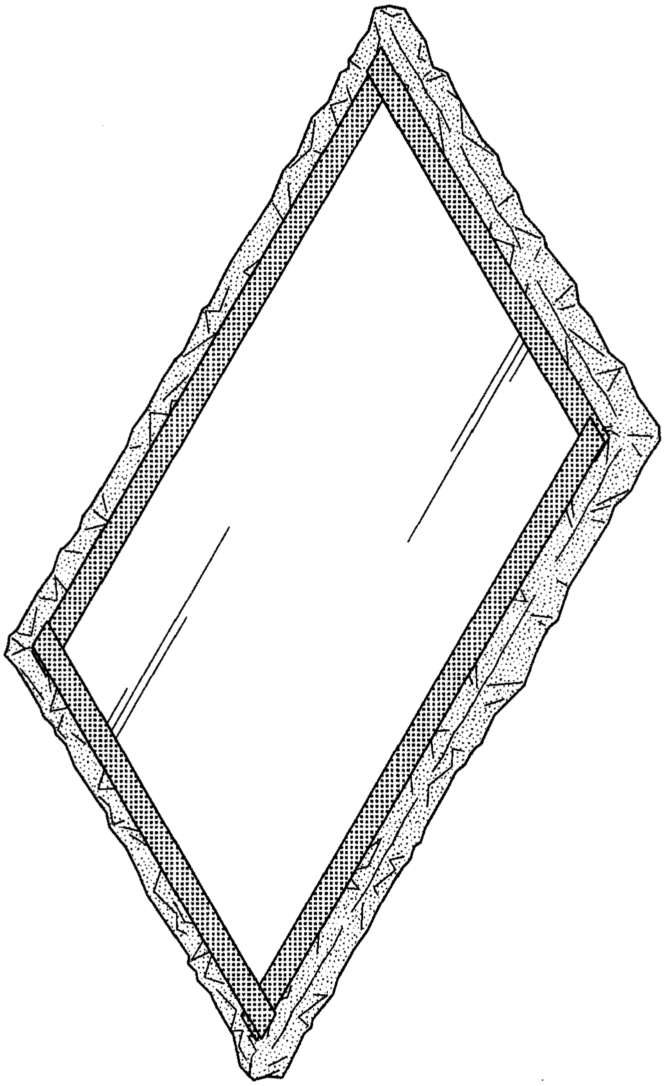
FIG. 10 shows an exemplary embodiment of finishing and sealing the metal sheet to the support frame.
Figure 11:
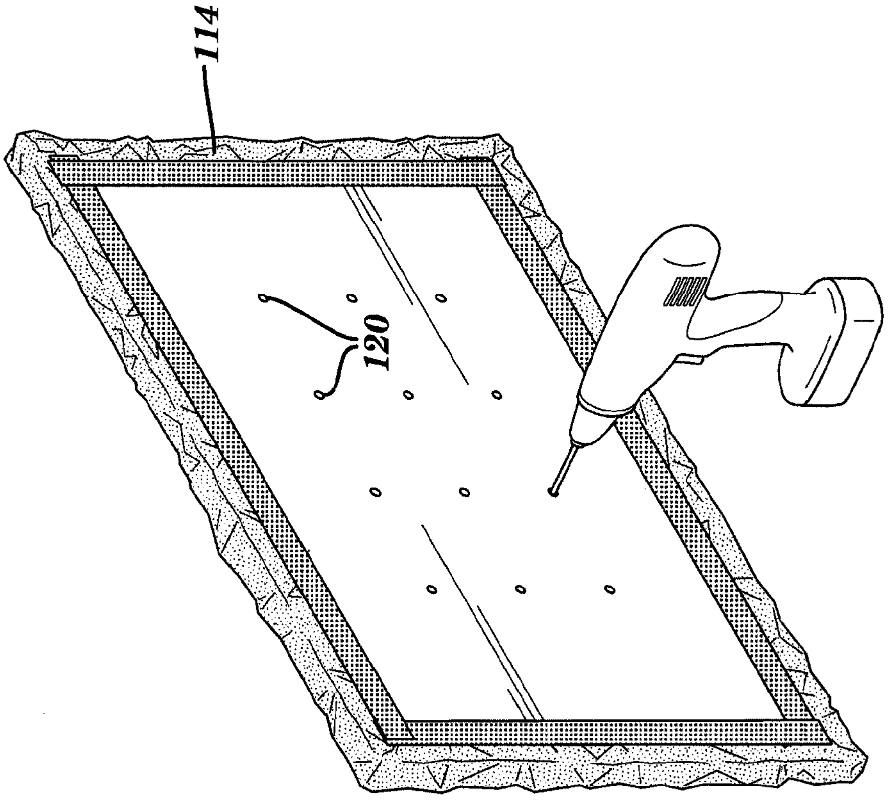
FIG. 11 shows an exemplary embodiment of drilling through holes through the back support of the support frame.

In some embodiments, it may be necessary to stretch the metal sheet and polymer layers such that the artwork is adequately secured to the support frame and the sculpted three-dimensional surface reflects the image intended by the artist. FIG. 10 is a photographic illustration of finishing and sealing the back of the support frame to the metal sheet. Again, in order to adhere the deformed-coated metal sheet to the rigid support frame it can be adhered and or mechanically anchored along it the support frame edges. The metal sheet 100 is sealed to the edges 118 of the support frame 114.

Figure 12:
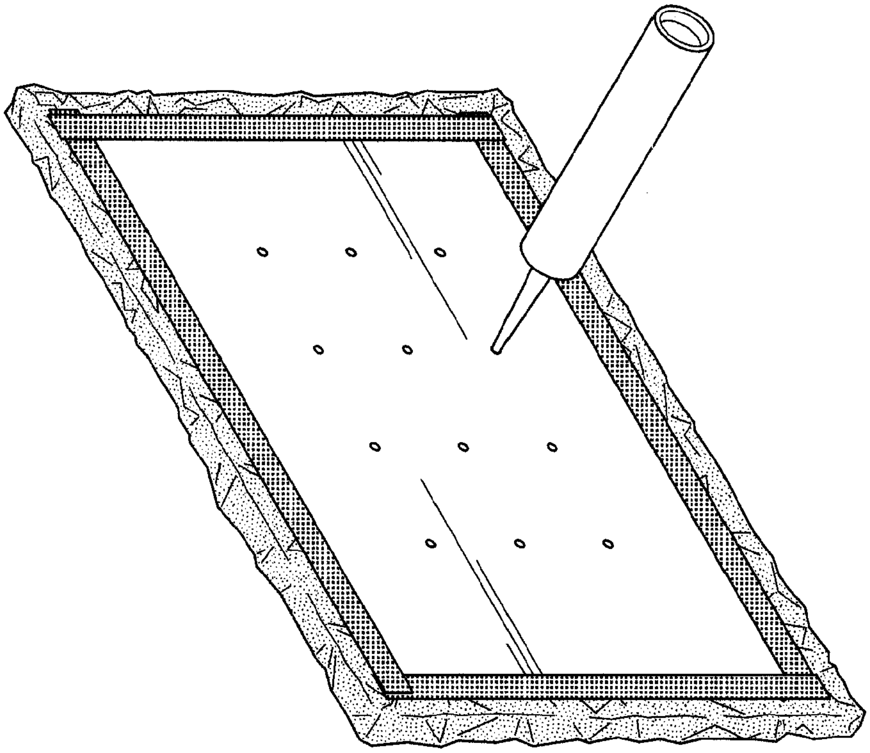
FIG. 12 shows an exemplary embodiment of filling the voids between the inner surface of the metal sheet and the back support with a back filler material.

Depending on the scale of the relief, bumps, texture, etc. on the three-dimensional surface of the artwork, it can be helpful to fill the voids created by such texture between the support frame and the inner surface of the metal sheet. Without a back filler to provide support/integrity the three-dimensional texture of the surface could be susceptible to damage, such as crushing, indentation, deformation, and the like, thereby destroying the artistic image imagined by the artist. In one embodiment, in order to prevent such an occurrence, access holes 120 can be drilled through the back of the support frame (as illustrated by FIG. 12). Through the access holes 120, a back filler support material can be injected. Exemplary back filler materials will support the three-dimensional surface and prevent alteration of the image. Exemplary back filler materials can include, without limitation, adhesives in the form of solidifying polymers, stone/polymer slurries which then cure or solidify to create a solid and well bonded structure (e.g. liquid rubber), spray foam gap filler, marine foams, and the like. Again, the size of the voids between the back support and the inner surface of the three-dimensional metal sheet will determine the type of back filler material suitable for providing integrity and durability to the artwork.

After application of deformed metal-coated structure to the support frame, the three-dimensional outer surface can then be reworked (i.e., deformed, and the like) as necessary to perfect the artist's vision of the surface image. An artist can rework the mounted deformed metal-coated structure with a tool, such as a paint brush, stylus, screw driver, or the like.

Figure 13:
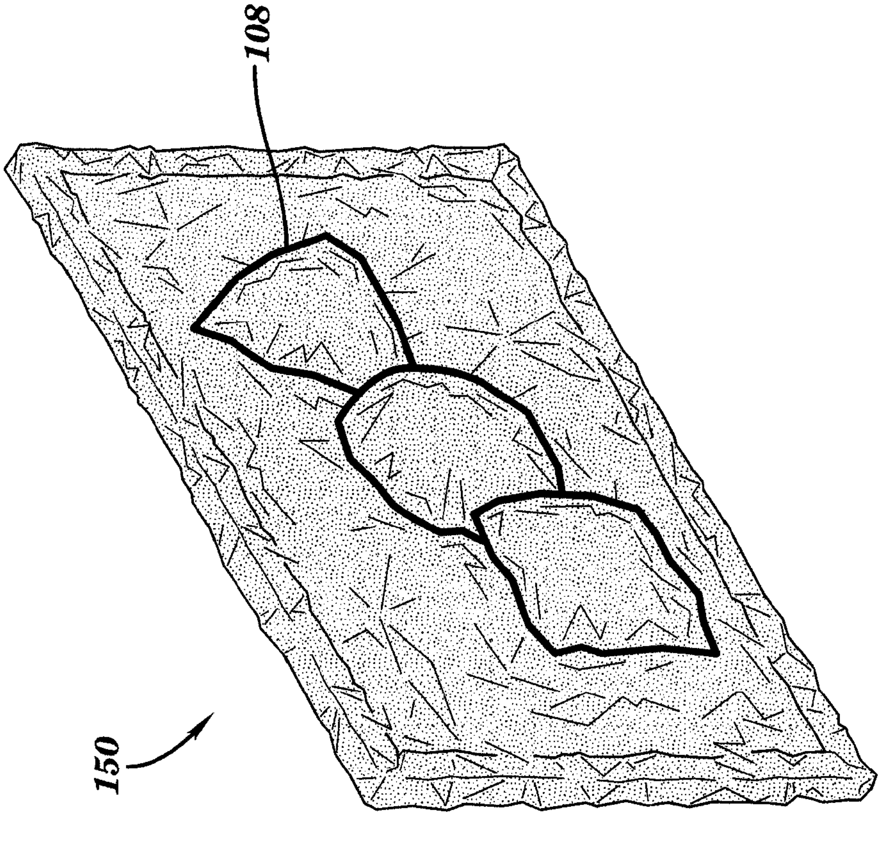
FIG. 13 shows an exemplary embodiment of the finished mixed media artwork after applying a polymer finishing layer to the three-dimensional surface.

In a final step, the three-dimensional mixed media artwork is coated with one or more protective finish layers. The protective coating can have any thickness necessary to protect the outer surface of the artwork. Moreover, the protective finish layer(s) can be configured to provide the desired finish to the artwork, such as glossy or flat reflectivity. The final protective coating layer(s) can also be applied in a horizontal orientation to create pools of polymer of varying thickness, such an application method can provide for controlled, interesting light reflectivity and transmission effects. The pools of polymer in the undulations of the three-dimensional surface 112 can create a lensing effect of the light. This provides a further uniqueness to the finished mixed media artwork. FIG. 13 is a photographic illustration of the final mixed media artwork 150 created by the methods described herein.

Figure 14:
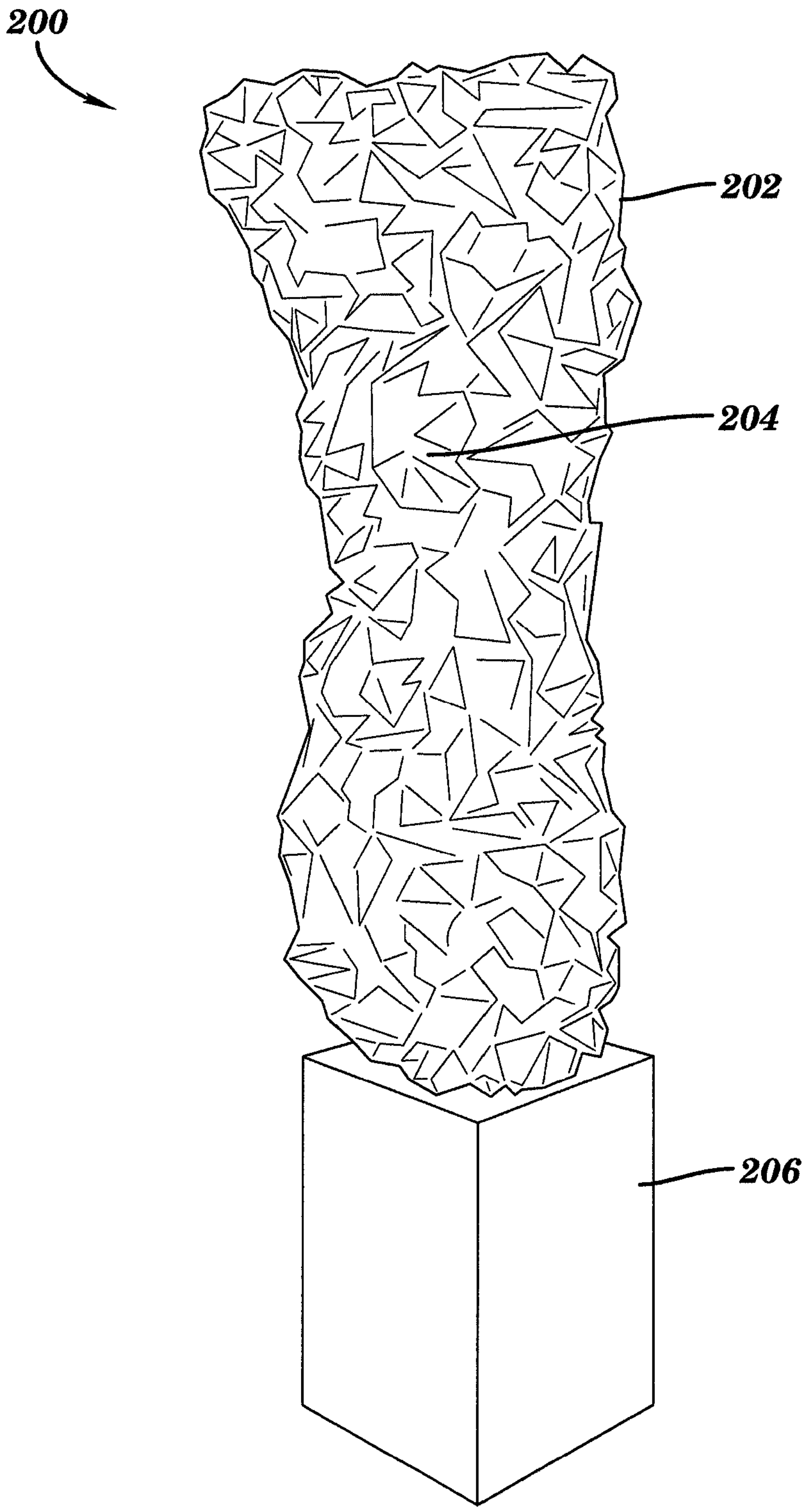
FIG. 14 shows an exemplary embodiment of a freestanding mixed media artwork with a support base.

As mentioned above, another embodiment of a mixed media artwork can be a freestanding, sculpture-type object that does not require or is not intended to be mounted flush to a vertical surface, such as a wall. Such a structure can be formed in much the same method as a more planar art form described above, the only difference the degree in which the metal sheet is deformed to create a three-dimensional surface. In fact, rather than a three-dimensional, yet planar type surface of the mixed media artwork 150, the metal sheet can be severely deformed such that the sheet takes on a three-dimensional shape able to be displayed as a standalone structure or with a support base to form a freestanding article. For example, in one embodiment, the metal sheet can folded over to form a bag shape by overlapping the edges, and wherein only a small hole is left in the surface of the three-dimensional shape. Through this hole a back filler material can be applied (e.g., injected) to provide support to the sculpture. The back filler material can be any of those materials described above. For example, a self-curing two-part marine foam can be used. Foam can be a useful back filler material when it is desirable for the sculpture to have the appearance of a heavy industrial piece of metal, but actually be light in weight and easily moved from location to location. In some embodiments, the standalone artwork can further include a base support, for example extending from the hole in the metal sheet. The base support can provide a stand for the sculpture, or it can be used to attach the sculpture to any another object, such as, without limitation, a floor, rock, another piece of art, the ground, and the like. FIG. 14 illustrates an exemplary embodiment of the mixed media artwork as a standalone sculpture 200. The mixed media artwork sculpture 200 includes a metal sheet deformed into a three-dimensional object 202 comprising an exterior and an interior; a support filler material disposed in the interior to provide support to the three-dimensional object; an adhesive layer disposed on the exterior; one or more color polymer layers disposed on the adhesive layer, wherein the one or more polymer layers create an image 204 on the exterior; and a base support 206 attached to the three-dimensional object 202.

The singular forms "a," "an," and "the" include plural referents unless the context clearly dictates otherwise. The endpoints of all ranges directed to the same characteristic or component are independently combinable and inclusive of the recited endpoint. All references are incorporated herein by reference. As used herein and throughout, "disposed," "contacted," and variants thereof refers to the complete or partial physical contact between the respective materials, substrates, layers, films, and the like. Further, the terms "first," "second," and the like herein do not denote any order, quantity, or importance, but rather are used to distinguish one element from another.

While specific embodiments have been shown and described, various modifications and substitutions can be made thereto without departing from the spirit and scope of the invention. Accordingly, it is to be understood that the present invention has been described by way of illustration and not limitation.

What is claimed is:

1. A mixed media artwork, comprising:

a metal sheet deformed into a three-dimensional object comprising an exterior and an interior;

a support filler material disposed in the interior to provide support to the three-dimensional object;

an adhesive layer disposed on the exterior;

one or more color polymer layers disposed on the adhesive layer, wherein the one or more polymer layers create an image on the exterior;

one or more transparent layers disposed in alternating fashion between each of the one or more color polymer layers, wherein the interleaved transparent layers are configured to allow light to transmit between the one or more color polymer layers; and one or more polymer finish layers disposed over all of the one or more polymer layers and one or more transparent layers, wherein the one or more polymer finish layers are configured to form pools in one or more undulations in the three-dimensional outer surface and provide a lensing effect to light that reflects on the surface.

2. The mixed media artwork of claim 1, further comprising a base support attached to the three-dimensional object.

* * * * *